United States Patent
White et al.

(10) Patent No.: US 8,439,988 B2
(45) Date of Patent: May 14, 2013

(54) COFFEE GROUNDS-BASED FUEL AND METHOD OF MANUFACTURE

(76) Inventors: Elizabeth White, Reno, NV (US);
Audrey Burns, Reno, NV (US)

( * ) Notice: Subject to any disclaimer, the term of this patent is extended or adjusted under 35 U.S.C. 154(b) by 0 days.

(21) Appl. No.: 13/172,525

(22) Filed: Jun. 29, 2011

(65) Prior Publication Data

US 2012/0000119 A1 Jan. 5, 2012

Related U.S. Application Data

(60) Provisional application No. 61/361,329, filed on Jul. 2, 2010.

(51) Int. Cl.
*C10L 5/48* (2006.01)
*C10L 5/44* (2006.01)

(52) U.S. Cl.
USPC .................. 44/605; 44/571; 44/589

(58) Field of Classification Search .......... 44/550, 44/551, 560, 565, 567, 576, 577, 589, 605, 44/606, 607
See application file for complete search history.

(56) References Cited

U.S. PATENT DOCUMENTS

| | | | | |
|---|---|---|---|---|
| 3,928,677 A | * | 12/1975 | Anthony | 44/519 |
| 4,326,854 A | * | 4/1982 | Tanner | 44/577 |
| 5,910,454 A | * | 6/1999 | Sprules | 44/535 |
| 6,113,662 A | * | 9/2000 | Sprules | 44/535 |
| 6,719,816 B2 | * | 4/2004 | Barford | 44/535 |
| 6,793,697 B2 | * | 9/2004 | Sprules et al. | 44/535 |
| 2008/0196301 A1 | * | 8/2008 | de Oliveira et al. | 44/535 |
| 2008/0282601 A1 | * | 11/2008 | Luttke | 44/275 |
| 2010/0300368 A1 | * | 12/2010 | Myers et al. | 119/171 |

* cited by examiner

*Primary Examiner* — Pamela H Weiss
(74) *Attorney, Agent, or Firm* — John D. Long, Esq.

(57) ABSTRACT

One possible embodiment could be a composition for coffee ground-based fuel comprising: dried, spent coffee grounds by 54% by weight; vegetable shortening by 23% by weight; brown sugar by 20% by weight; and corn syrup by 2% by weight, wherein the vegetable shortening and brown sugar and mixed together and heated slowly until a boil is achieved, then removing resultant mixture from heat, mixing in dried, spent coffee grounds into resultant mixture, then mixing in corn syrup into the resultant mixture, pouring and pressing the resultant mixture into a selected form for final shaping, then when the mixture has cooled to room temperature, removing it from the form for use.

11 Claims, 2 Drawing Sheets

COFFEE GROUNDS-BASED FUEL AND METHOD OF MANUFACTURE

CROSS-REFERENCES TO RELATED APPLICATIONS

This application claims the benefit under 35 U.S.C. §119 (e) of U.S. Provisional Patent Application No. 61/361,329, filed on Jul. 2, 2010, the contents of which are relied upon and incorporated by reference.

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention relates to solid combustible fuels made from recycled materials. More particularity to those types of fuels made from dried, spent coffee grounds.

BACKGROUND

The use of manufactured, alternative fuels in standard fireplaces and stoves in place of traditional fuels such as wood, coal, and other standard non-manufactured fuels is generally well known. One such type of manufactured, alternative fuel that is now gaining prominence and acceptance is the type that utilizes dried, spent coffee grounds as its major combustion component. The benefit of using the coffee-ground fuel over the traditional fuels is the coffee ground-based fuel generally proves a higher energy output (hotter and brighter flame), longer lasting fire, and the like. As compared to traditional wood-based fuel products, coffee ground based-fuels can be seen being a greener alternative: generally having cleaner burning capabilities (e.g., leading to-less pollution emission and less creosote buildup in the venting system of stoves/fireplaces); providing means to reduce demand for wood as a natural resource for fuel overall; being a domestically-available alterative fuel source; and possibly reduced landfill deposits by finding alternative consumption uses for waste matter (e.g., coffee grounds) otherwise placed in landfills.

Coffee ground-based fuels, while generally providing the above-stated advantages over wood based fuels, may still have some disadvantages. One possible disadvantage is that coffee ground-based fuels may still incorporate wax in their composition (e.g., as a binder and fast igniter). This ingredient can be seen as being expensive (e.g., raising the cost of the coffee ground-based fuel) as well a possibly providing a sooty burn with significant amount of carbon dioxide being emitted to the atmosphere (e.g., enhanced carbon footprint). Depending on the quality and quantity of the wax used in the coffee ground-based fuel, the wax could possibly further impair the combustion of the fuel leading to decreased flame brightness/height with a resultant reduced heat output. The combustion of wax in such fuel compositions may also provide an undesired scent during the fuel combustion thereby possibly reducing the aesthetic value of the experience (e.g., fireplace usage).

What is needed therefore is a coffee ground-based fuel that does not utilize wax as a component in order to provide a better combustion, higher-energy emission, reduced carbon footprint, and greater aesthetic experience over those coffee ground-based fuels which do utilize wax as an ingredient.

SUMMARY OF ONE EMBODIMENT OF THE INVENTION

Advantages of One or More Embodiments of the Present Invention

The various embodiments of the present invention may, but do not necessarily, achieve one or more of the following advantages:

to provide a coffee ground-based fuel that does not utilize wax as an ingredient;

the ability to create a coffee ground-based fuel that is easier and cheaper to make than a coffee ground-based fuel that utilizes wax as a ingredient;

to provide a core for use in fire log having an encapsulating out paper shell; and to provide a coffee ground-based fuel that may burn hotter and longer than those coffee ground-based fuels utilizing wax as an ingredient.

These and other advantages may be realized by reference to the remaining portions of the specification, claims, and abstract.

Brief Description of One Embodiment of the Present Invention

One possible embodiment could be a composition for coffee ground-based fuel comprising of dried, spent coffee grounds by 54% by weight; vegetable shortening by 23% by weight; brown sugar by 20% by weight; and corn syrup by 2% by weight.

Another possible embodiment could methodology for making coffee ground-based fuel comprising of the steps of a methodology for making a coffee ground-based fuel comprising the following steps providing the following ingredients of coffee ground-based fuel in the amounts of dried, spent coffee grounds by 54% by weight; vegetable shortening by 23% by weight; brown sugar by 20% by weight; and corn syrup by 2% by weight; mixing together the vegetable shortening and brown sugar to form an resultant mixture; heating the resultant mixture slowly until it begins to boil; removing resultant mixture from heat after it begins to boil; and mixing dried, spent coffee grounds and corn syrup into the resultant mixture to form the completed fuel.

Yet another possible embodiment could be a fire log comprising of a core made from dried spent coffee grounds; vegetable shortening; weight; brown sugar, and corn syrup and encapsulated within a paper outer shell.

The above description sets forth, rather broadly, a summary of at least one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

One possible embodiment of the invention 10 could be a composition for coffee ground-based fuel and method 100 of manufacture for same. The composition of the invention 10 could comprise of the following ingredients in the following proportions:

1) vegetable shortening-23% by wt;
2) brown sugar-20% by wt;
3) corn syrup-2% by wt, and
4) dried coffee grounds-54% by wt.

To properly form the composition the vegetable shortening and brown sugar could be mixed together and heated slowly forming a resultant mixture. When the resultant mixture achieves a boil, it can be removed from the heat. While resultant mixture is still hot, dried, spent coffee grounds may be first mixed into the resultant mixture. Corn syrup may then be mixed into the resultant mixture to generally form the composition. When the composition is warm to the touch, but no longer hot, it generally has a moist and crumbly texture. At this temperature, it may be is pressed into a form that will provide the composition with a desired and suitable shape. When the composition has cooled to room temperature (e.g., 25° C.) it may be removed from the form (turning the form upside down and slightly tapping the bottom of the form.)

The inventors have noted that invention could be made with molasses being substituted for corn syrup in the same proportion. The composition utilizing molasses as a substitute for corn syrup would burn satisfactorily but generally it would not burn as well as the corn syrup-based embodiment of the invention. For handmade batches of the invention 10, the following amounts of ingredients could be used to make the composition: 1 cup vegetable shortening; 1 cup brown sugar (6 ounces wt); 1 table spoon of corn syrup; 4 cups ground coffee resulting in approximately 30 ounces (wt) of invention. In another version, brown sugar could be increased to up to 12.8 oz.

Figure 1:
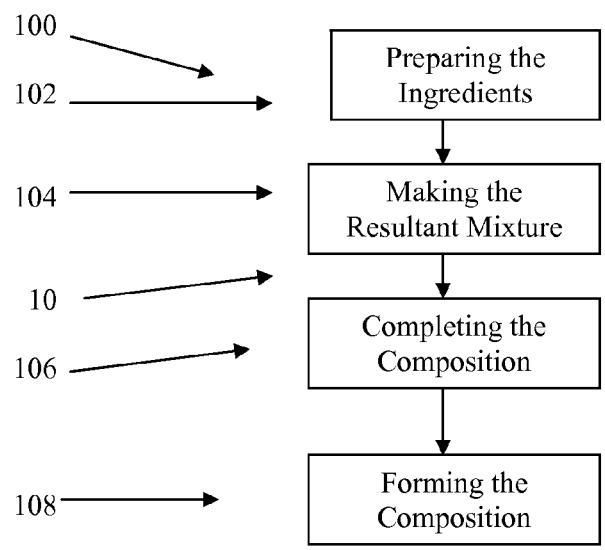
FIG. 1 is substantially a flow chart of one embodiment for the manufacture of the present invention.

As substantially shown in FIG. 1, the methodology or process 100 of manufacturing the coffee-grounds based fuel could begin with step 102, preparing ingredients. In this step, the spent coffee grounds could be dried (e.g., through evaporation, and or in conjunction with a heating source) wherein most of the moisture removed. Suitable means could then be employed to ground the dried grounds into a fine particulate matter. The other ingredients could be gathered and all the ingredients are suitably measured out in the appropriate quantities for use in the mixture. After the completion of this step 102, the process 100 could proceed to the step 104, making the resultant mixture.

In step 104, making the resultant mixture, the vegetable shortening and brown sugar are mixed thoroughly together form the resultant mixture. This resultant mixture is then heated evenly over a low heat to allow the mixture to reach a boil that allows the brown sugar to be fully dissolved into the resultant mixture without allowing burning of the two ingredients. Once the brown sugar is fully dissolved, resultant mixture is removed from the heat source. At the substantial completion of the step 104, the process can substantially proceed to step 106, completing the composition.

In step 106, completing the composition, the dried, spent coffee grounds are slowly and thoroughly added into so the mixture until the mixture has a uniform appearance. After the coffee grounds have been added and while the mixture is still warm, the corn syrup is added to make the final mixture. After the substantial completion of step 106, the process 100 can proceed to step 108, forming into shape.

In step 108, forming into shape, the completed mixture should still be warm and be of a loose, moist, crumbly nature. The completed mixture could be transferred to suitable form (s) or mold(s) used to provide or impart a desired shape for composition. Adequate pressure is brought to bear to the top of the mixture as placed into the respective mold to press the mixture into the various recesses of the mold. When the shaped composition has cooled to room temperature and is dry to the touch, the shaped composition could be released from the form or mold and is substantially ready for use as fuel.

Figure 2:
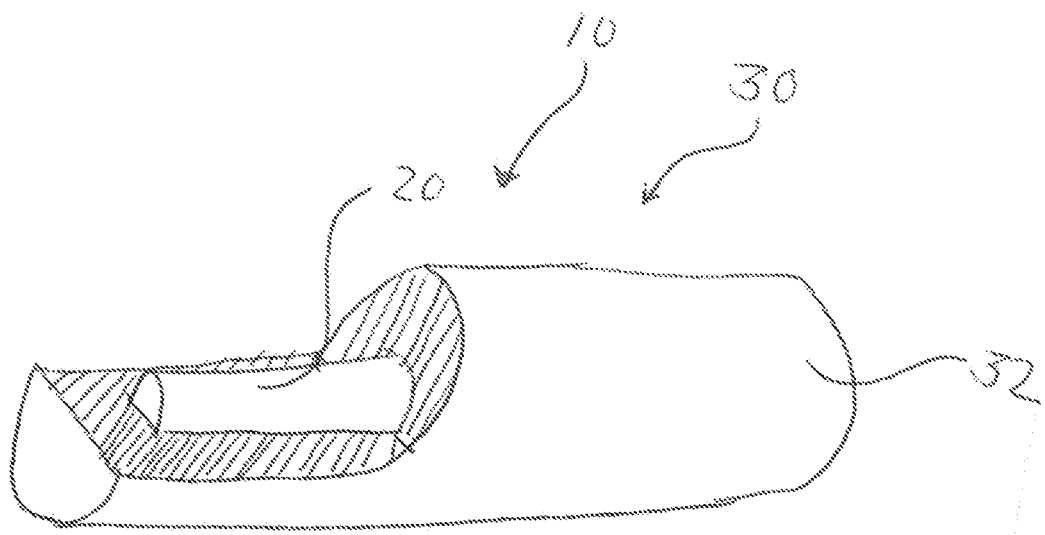
FIG. 2 is substantially a perspective cutaway view of one embodiment of the invention as a fire log having a coffee ground-based core encapsulated within a paper shell.

One of the concerns for the commercialization of the invention 10 is the relative high expense of vegetable-based shorting (and similar products), as one of its ingredients for the composition, may impact on the overall retail cost of a coffee grounds fuel log especially as to size, flame duration, and the like. Consumers could hesitate in the purchase of the invention 10 based on such economics. As substantially shown in FIG. 2, one possible solution could be the use of the invention 10 for a core 20 for an otherwise paper-based fire log 30. For such an embodiment of the invention, the composition could be made as described above wherein the final mixture is pressed, molded, or otherwise formed into a substantially cylindrical shaped core 20 of definite length. Around this core could be paper (e.g. paper strips) that are concentrically wrapped around and encapsulating the core 20 to build up the outer paper shell 32. When shell 32 is substantially burnt away and the core 20 is ignited, the core 20 could burn with a greater intensity (e.g., give off greater amount of heat) than the shell 32. The greater intensity of burning of the core 20 could be in manner reminiscent of coals (not shown) resulting from the burning of a wood-based fire (not shown.)

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given. These and other advantages may be realized by reference to the remaining portions of the specification, claims, and abstract.

As shown above, the present invention could provide a coffee ground-based fuel that does not utilize wax as an ingredient and that is easier and cheaper to make than a coffee ground-based fuel which utilizes wax as an ingredient; generally avoiding an unpleasant smell of wax being burnt with coffee ground-based fuel; a coffee ground-based fuel that generally burns hotter and longer than those coffee ground-based fuels utilizing wax as an ingredient.

What is claimed is:

1. A wax-less fire log comprising of:
   (A) a core made from dried spent coffee grounds, vegetable shortening, brown sugar, and corn syrup, the core having a cylindrical shape; and
   (B) an outer shell is made from paper strips, the outer shell encapsulates the core;
   wherein neither the core nor the outer shell contains wax.

2. The wax-less fire log of claim 1 wherein the vegetable shortening is 23% by weight.

3. The wax-less fire log of claim 1 wherein the brown sugar is 20% by weight.

4. The wax-less fire log of claim 1 wherein the corn syrup is 2% by weight.

5. The wax-less fire log claim 1 wherein the strips of paper are concentrically wrapped around the core.

6. The wax-less fire log of claim 1 wherein the core burns hotter than the outer shell.

7. A wax-less fire log comprising of:
   (A) a core made from dried spent coffee grounds, vegetable shortening, brown sugar, and molasses, the core having a cylindrical shape;
   (B) an outer shell comprising of paper wrappings, the outer shell encapsulates the core,
   wherein neither the core nor the outer shell contains wax.

8. The wax-less fire log of claim 7 wherein the vegetable shortening is 23%.

9. The wax-less fire log of claim 7 wherein the brown sugar is 20% by weight.

10. The wax-less fire log claim 7 wherein the strips of paper are concentrically wrapped around the core.

11. The wax-less fire log of claim 7 wherein the core burns hotter than the outer shell.

\* \* \* \* \*